United States Patent
Yoon et al.

(10) Patent No.: US 12,464,606 B2
(45) Date of Patent: Nov. 4, 2025

(54) INDUCTION HEATING APPARATUS AND METHOD FOR CONTROLLING THE SAME

(71) Applicant: LG ELECTRONICS INC., Seoul (KR)

(72) Inventors: Bada Yoon, Seoul (KR); John Kang, Seoul (KR); Wongyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 864 days.

(21) Appl. No.: 17/667,904

(22) Filed: Feb. 9, 2022

(65) Prior Publication Data

US 2022/0322499 A1 Oct. 6, 2022

(30) Foreign Application Priority Data

Feb. 9, 2021 (KR) .................... 10-2021-0018504

(51) Int. Cl.
*H05B 6/06* (2006.01)
*H05B 6/04* (2006.01)

(52) U.S. Cl.
CPC ............. *H05B 6/065* (2013.01); *H05B 6/04* (2013.01); *H05B 2213/05* (2013.01)

(58) Field of Classification Search
CPC ............. B29C 65/483; B29C 65/4835; B29C 65/5028; B29C 65/5057; B29C 65/8223; B29C 66/1312; B29C 66/43; B29C 66/71; B29C 66/712; B29C 66/73152; B29C 66/73751; B29C 66/73755; B29C 66/73756; H05B 2213/05; H05B 6/04; H05B 6/062; H05B 6/065
USPC ....... 219/661, 625, 626, 635, 650, 620, 660, 219/664, 665, 666, 672
See application file for complete search history.

(56) References Cited

U.S. PATENT DOCUMENTS

2012/0248098 A1* 10/2012 Lee ................ H05B 6/1272
219/660
2018/0376546 A1 12/2018 Jang et al.
2019/0141793 A1 5/2019 Yoon et al.

FOREIGN PATENT DOCUMENTS

| EP | 3 200 561 A1 | 8/2017 |
|---|---|---|
| EP | 3 481 147 A1 | 5/2019 |
| JP | 2015050118 A * | 3/2015 |
| KR | 10-2012-0109965 | 10/2012 |

(Continued)

OTHER PUBLICATIONS

Translation of JP2015050118, "Induction Heating Cooker", Mar. 16, 2015, by WIPO. (Year: 2015).*

(Continued)

*Primary Examiner* — Quang T Van
(74) *Attorney, Agent, or Firm* — KED & ASSOCIATES, LLP

(57) ABSTRACT

An induction heating apparatus according to one embodiment includes a working coil disposed in a position corresponding to a heating zone, an inverter circuit that includes a plurality of switching elements and supplies current to the working coil, a driving circuit that supplies a switching signal to each of the switching elements included in the inverter circuit, a current sensor that measures a resonance current value and a magnitude of resonance current flowing in the working coil, and a controller that supplies a control signal for adjusting a duty ratio and a frequency of the switching signal to the driving circuit, to drive the working coil.

17 Claims, 7 Drawing Sheets

(56) References Cited

FOREIGN PATENT DOCUMENTS

| | | | |
|---|---|---|---|
| KR | 10-2019-0001200 | | 1/2019 |
| KR | 10-2019-0038170 A | * | 4/2019 |
| KR | 10-2019-0051726 | | 5/2019 |

OTHER PUBLICATIONS

Extended European Search Report dated Jul. 6, 2022 issued in Application 22155799.4.
Korean Office Action dated Apr. 14, 2025, issued in Application No. 10-2021-0018504.

* cited by examiner

INDUCTION HEATING APPARATUS AND METHOD FOR CONTROLLING THE SAME

CROSS-REFERENCE TO RELATED APPLICATION

This application claims priority under 35 U.S.C. § 119 to Korean Application No. 10-2021-0018504, filed on Feb. 9, 2021, whose entire disclosure is hereby incorporated by reference.

BACKGROUND

1. Field

Disclosed herein is an induction heating apparatus and a method for controlling the same.

2. Background

Various types of cooking apparatuses are used at homes or restaurants to heat food items. Gas ranges that use gas as a fuel have been widely used as one of the cooking apparatuses. Currently, apparatuses that heat a container such as a pot by using electricity rather than gas are available.

Among methods of heating a container with electricity, induction heating involves generating eddy current in a container made of metal with a magnetic field that is generated around a coil when high-frequency power having predetermined magnitude is supplied to the coil, such that the object to be heated itself is heated.

With no container placed over (or provided on) a working coil, a continuous supply of current to the working coil is like an idle rotation, and results in waste of electric power and causes overheat of the induction heating apparatus. Thus, an accident can occur.

To solve the problem, an induction heating device and a pot detecting method thereof are disclosed in KR Patent Publication No. 10-2019-0051726, the subject matter of which is incorporated herein by reference. According to the document, it can be determined whether a container is placed over a working coil, based on resonance current generated in the working coil, when current is supplied to the working coil through an inverter circuit.

However, when the induction heating device detects a container using the method disclosed in the document, loud noise can occur in the working coil due to an instant increase in a peak-to-peak value of current supplied to the working coil. The driving noise can cause inconvenience to a user each time the user uses the induction heating device. Additionally, in some cases, the user can think that the induction heating device fails.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements and wherein.

DETAILED DESCRIPTION

Figure 1:
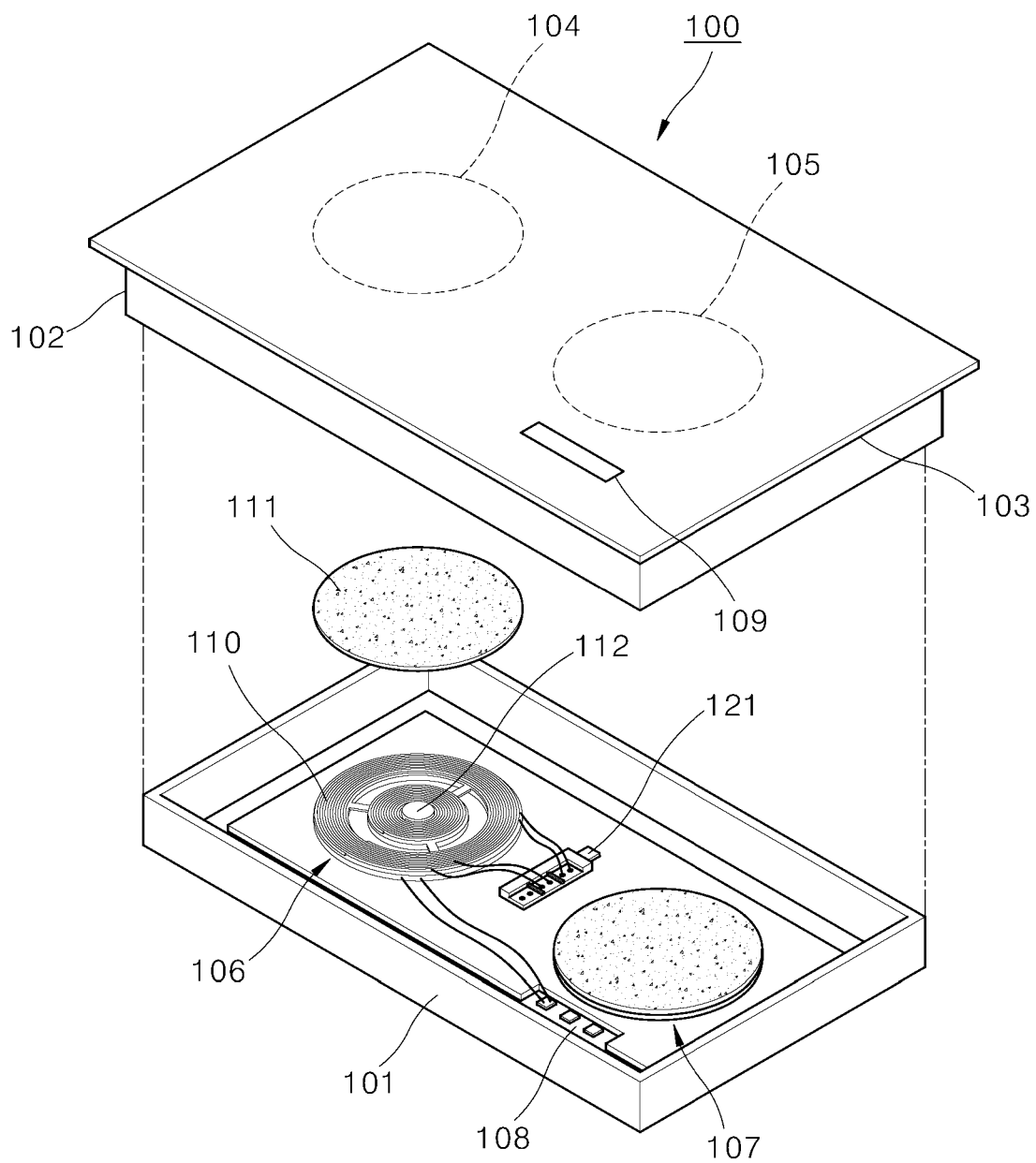
FIG. 1 is an exploded perspective view showing an induction heating apparatus of one embodiment.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary When any one component is described as being in the "upper portion (or lower portion)" of another component or "on (or under)" another component, any one component can be disposed on the upper surface (or lower surface) of another component, and an additional component can be interposed between the two components.

When any one component is described as being "connected", "coupled" or "connected" to another component, any one component can be directly connected or connected to another component, but an additional component can be "interposed" between the two components or the two components can be "connected", "coupled" or "connected" by an additional component.

Throughput the disclosure, each component can be provided as a single one or a plurality of ones, unless explicitly indicated otherwise.

In the disclosure, the singular forms "a", "an" and "the" are intended to include the plural forms as well, unless explicitly indicated otherwise. It is to be understood that the term "comprise" or "include," when used in this disclosure, is not interpreted as necessarily including stated components or steps, but can be interpreted as excluding some of the stated components or steps or as further including additional components or steps.

Hereafter, an induction heating apparatus and a method for controlling the same in several embodiments are described.

FIG. 1 is an exploded perspective view showing an induction heating apparatus of on embodiment. An induction heating apparatus 100 of one embodiment includes a case 101 that constitutes a main body, and a cover plate 102 that is coupled to the case 101 and that seals the case 101.

The cover plate 102 is coupled to the upper surface of the case 101, and seals the space formed in the case 101 from the outside. The cover plate 102 includes an upper plate 103 on which a container for cooking a food item is placed. In one embodiment, the upper plate 103 may be made of tempered glass such as ceramic glass, but a material for the upper plate 103 may vary depending on embodiments.

Heating zones 104, 105 corresponding to working coil assemblies 106, 107 respectively are formed on the upper plate 103. For a user to clearly recognize the positions of the heating zones 104, 105 lines or figures corresponding to the heating zones 104, 105 may be printed or marked on the upper plate 103.

The case 101 may be formed into a cuboid, the upper portion of which is open. The working coil assemblies 106, 107 for heating a container are disposed in the space formed in the case 101. Additionally, an interface 108 is disposed in the case 101, and the interface 108 allows the user to supply power or adjust lower levels of each of the heating zones 104, 105 and display information on the induction heating apparatus 100. The interface 108 may be implemented as a touch panel enabling a touch-based display of information as well as a touch-based input of information, but an interface 108 having a different structure may be used depending on embodiments.

A manipulation zone 109 may be disposed in a position of the upper plate 103, corresponding to the position of the interface 108. For the user's manipulation, characters or images and the like may be printed (or displayed) in the manipulation zone 109 in advance. The user may touch a specific point of the manipulation zone 109 with reference to the characters or images that are printed in advance in the manipulation zone 109, to perform desired manipulation. Information output by the interface 108 may be displayed through the manipulation zone 109.

The user may set a power level of each of the heating zones 104, 105 through the interface 108. Power levels may be displayed in the manipulation zones 109 as numbers (e.g., 1 to 9). When a power level of each of the heating zones 104, 105 is set, a required power value and a heating frequency of a working coil corresponding to each of the heating zones 104, 105 is determined. A controller drives each working coil such that an actual output power value of each working coil matches the required power value set by the user, based on the determined heating frequency.

A power supply 121 for supplying power to the working coil assemblies 106, 107 or the interface 108 is disposed in the space formed in the case 101.

The embodiment of FIG. 1 shows two working coil assemblies (i.e., a first working coil assembly 106 and a second working coil assembly 107) disposed in the case 101, for example. However, three or more working coil assemblies may be disposed in the case 101 depending on embodiments.

The working coil assemblies 106, 107 respectively include a working coil that forms an induction magnetic field by using high-frequency AC current supplied from the power supply 121. Further, the working coil assemblies 106, 107 may respectively include an insulating sheet that protects the coil from heat generated from a container. FIG. 1 shows that the first working coil assembly 106 includes a first working coil 110 for heating a container placed in (or on) the first heating zone 104, and a first insulating sheet 111, for example. Although not shown, the second working coil assembly 107 includes a second working coil and a second insulating sheet. The insulating sheet may be excluded depending on embodiments.

Additionally, a temperature sensor is disposed in the central portion of each of the working coils. FIG. 1 shows that a temperature sensor 112 disposed in the central portion of the first working coil 110, for example. The temperature sensor measures a temperature of a container placed in each of the heating zones. In one embodiment, the temperature sensor may be a thermistor temperature sensor that has resistance values that vary depending on a temperature of a container, but not limited.

In one embodiment, the temperature sensor outputs sensing voltage corresponding to a temperature of a container, and the sensing voltage output from the temperature sensor is delivered to the controller as discussed below. The controller may determine a temperature of a container based on magnitude of the sensing voltage output from the temperature sensor, and when the temperature of the container equals to or is higher than a predetermined reference value, performs an overheat protection operation by lowering an actual power value of a working coil or by stopping the driving of a working coil.

Though not illustrated in FIG. 1, a board onto which a plurality of circuits or elements including the controller is mounted may be disposed in the space formed in the case 101. The controller may drive each of the working coils to perform a heating operation, according to the user's instruction to initiate heating input through the interface 108. When the user inputs an instruction to end heating through the interface 108, the controller stops the driving of the working coil to end the heating operation.

Figure 2:
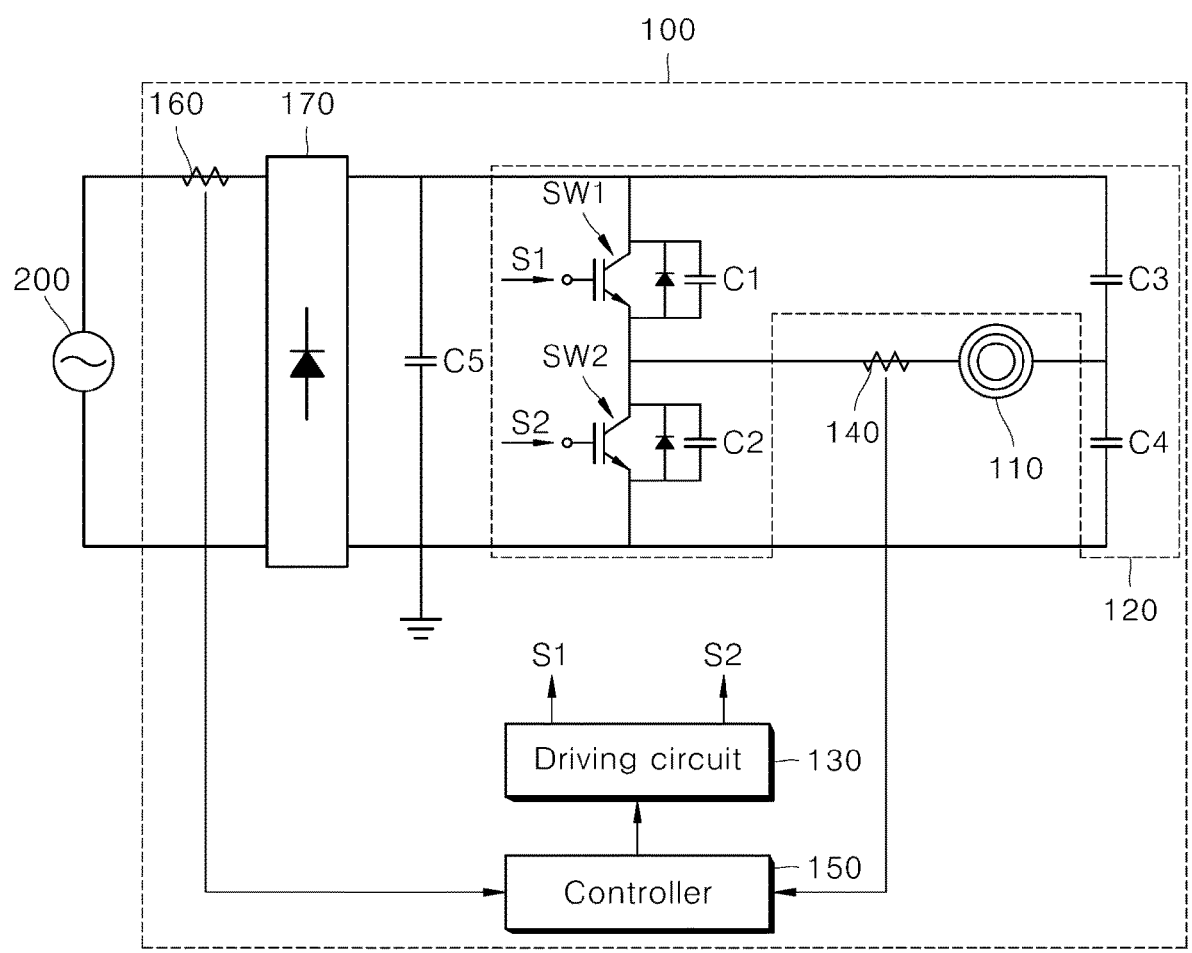
FIG. 2 is a circuit diagram showing an induction heating apparatus of one embodiment.

FIG. 2 is a circuit diagram showing the induction heating apparatus of one embodiment. The induction heating apparatus 100 of one embodiment includes a working coil 110, an inverter circuit 120, a driving circuit 130, a current sensor 140 and a controller 150. The induction heating apparatus 100 may further include a voltage sensor 160. Additionally, the induction heating apparatus 100 may further include a rectifying circuit 170, and a smoothing capacitor C5.

The working coil 110 is disposed in a position corresponding to a heating zone 104. As current flows, the working coil 110 heats an object to be heated by using resonance current that is generated between the working coil 110 and the object to be heated. The working coil 110 may receive current from the inverter circuit 120.

The inverter circuit 120 includes a plurality of switching elements and supplies current to the working coil 110. The inverter circuit 120 may include a first switching element SW1 and a second switching element SW2. That is, the inverter circuit 120 of the induction heating apparatus 100 may be implemented as a half-bridge circuit including two switching elements SW1, SW2, as illustrated in FIG. 2. In another embodiment, the inverter circuit 120 may also be implemented as a full-bridge circuit including four switching elements. Hereafter, the inverter circuit 120 implemented as a half-bridge circuit as in FIG. 2 is described.

The inverter circuit 120 converts current supplied from an external power source 200 and supplies the converted current to the working coil 110. In this case, current supplied from the external power source 200 may be rectified and smoothed through the rectifying circuit 170 and the smoothing capacitor C5 and then supplied to the inverter circuit 120.

The rectifying circuit 170 may include a plurality of diode elements, and in one embodiment, the rectifying circuit 170 may be a bridge diode circuit. The rectifying circuit 170 may rectify AC input voltage supplied from the external power source 200 and output voltage having pulse waveforms.

The smoothing capacitor C5 may smooth the voltage rectified by the rectifying circuit 170 and output DC link voltage.

The DC link voltage input to the inverter circuit 120 is converted into AC current, based on the turn-on and turn-off operations (i.e., switching operations) of the switching elements SW1, SW2 included in the inverter circuit 120. The AC current converted by the inverter circuit 120 is supplied to the working coil 110. As resonance occurs in the working coil 110, eddy current flows in a container, and the container is heated.

The driving circuit 130 supplies a switching signal to each of the switching elements SW1, SW2 included in the inverter circuit 120. In this case, the switching signal may be a pulse width modulation (PWM) signal having a predetermined duty ratio and frequency respectively. The duty ratio denotes a ratio of time during which a switching signal has a high value within one period.

As the driving circuit 130 supplies a switching signal, each of the switching elements SW1, SW2 included in the inverter circuit 120 is turned on or turned off. In this case, the first switching element SW1 and the second switching element SW2 may be turned on or turned off respectively by a first switching signal S1 and a second switching signal S2. Each of the switching elements SW1, SW2 is turned on when each of the switching signals S1, S2 is at a high value, and is turned off when each of the switching signals S1, S2 is at a low value.

The driving circuit 130 may generate a switching signal, based on a control signal received from the controller 150 as described below, and provides the generated switching signal to the inverter circuit 120.

The current sensor 140 measures (or determines) a resonance current value that is magnitude of resonance current flowing in the working coil 110. That is, the current sensor 140 measures a resonance current value while the working coil 110 is being driven, and transmits the resonance current value to the controller 150.

The voltage sensor 160 measures (or determines) a supplied voltage value that is a voltage value supplied to the inverter circuit 120. In other words, the voltage sensor 160 determines a voltage value supplied from the external power source 200 as a supplied voltage value. That is, the voltage sensor 160 may measure a voltage value before the rectifying of the rectifying circuit 170 and the smoothing of the smoothing capacitor C5. Then the voltage sensor 160 may transmit the supplied voltage value measured to the controller 150.

The controller 150 drives the working coil 110 by supplying a control signal, which controls a duty ratio and frequency of the switching signals S1, S2, to the driving circuit 130. That is, the controller 150 may adjust the duty ratio and frequency of the switching signals S1, S2 by controlling the driving circuit 130 based on the control signal.

When receiving an instruction to initiate heating from the user, the controller 150 determines a frequency (i.e., a heating frequency) corresponding to a required, i.e. instructed, power value of the working coil 110, and supplies a control signal corresponding to the determined heating frequency to the driving circuit 130. Accordingly, as a switching signal S1, S2 is output from the driving circuit 130 and input to each of the switching elements SW1, SW2, the working coil 110 is to operate. As the working coil 110 operates, eddy current flows in the container, and the container is heated.

Before the container is heated through the above processes, the controller 150 sets and adjusts a duty ratio and frequency of the switching signals S1, S2 to perform an operation of detecting a container. The operation of detecting a container is performed to determine whether a container is placed in (or on) the heating zone 104 corresponding to the working coil 110.

The controller 150 supplies, through the driving signal, a switching signal S1, S2 having a first predetermined reference duty ratio and a first predetermined reference frequency to each of the switching elements SW1, SW2 included in the inverter circuit 120, so as to initiate (or start) the operation of detecting a container. Additionally, the controller 150 may increase the duty ratio of the switching signal S1, S2 to a second predetermined reference duty ratio and decrease the frequency of the switching signal S1, S2 to a second predetermined reference frequency, so as to perform the operation of detecting a container.

Figure 3:
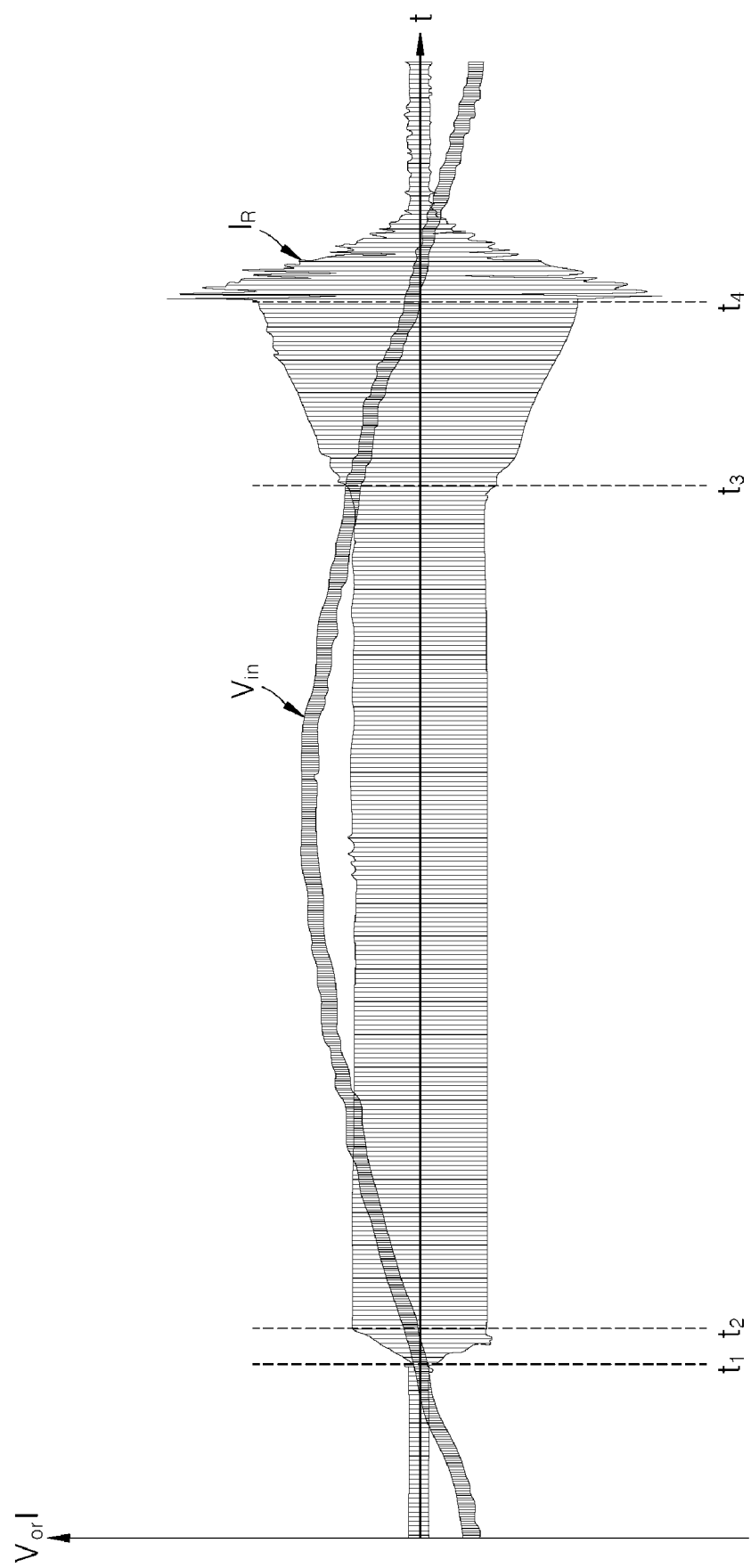
FIG. 3 is a graph of resonance current values detected by a current sensor of the induction heating apparatus of one embodiment, and supplied voltage values detected by a voltage sensor of the induction heating apparatus of one embodiment.

The operation of detecting a container is specifically described with reference to the graphs of FIGS. 3 to 6. FIG. 3 is a graph of resonance current values detected by a current sensor of the induction heating apparatus, and supplied voltage values detected by a voltage sensor of the induction heating apparatus. FIG. 3 shows the graphs of supplied voltage values Vin measured (or determined) by the voltage sensor 160 and resonance current values IR detected (or determined) by the current sensor 140.

The controller 150 initiates the operation of detecting a container when the supplied voltage value Vin is 0 V. On the graph of FIG. 3, the supplied voltage value Vin becomes 0 V at time point t1. Accordingly, at time point t1, the controller 150 initiates the operation of detecting a container.

Since the controller 150 initiates the operation of detecting a container when the supplied voltage value Vin is 0 V, noise, which may be generated when the operation of detecting a container starts, may be minimized.

At time point t1 of the graph, the controller 150 may control the driving circuit 130 to supply a switching signal S1, S2 having a first predetermined reference duty ratio and a first predetermined reference frequency to each of the switching elements SW1, SW2 included in the inverter circuit 120. The minimum value of the duty ratio is the smallest value among duty ratios of the switching signal that can be set, and is a value that can be set differently according to an embodiment.

The first reference duty ratio may be set to a minimum value (e.g., 20%) of duty ratios that can be performed by the switching signals S1, S2 supplied to the switching elements SW1, SW2.

As the first reference duty ratio is set to a minimum value of duty ratios, sudden excessive supply of current to the working coil 110 may be prevented in the initial stage of the operation of detecting a container.

Further, the first reference frequency may be set to a high frequency (e.g., 120 kHz).

Figure 4:
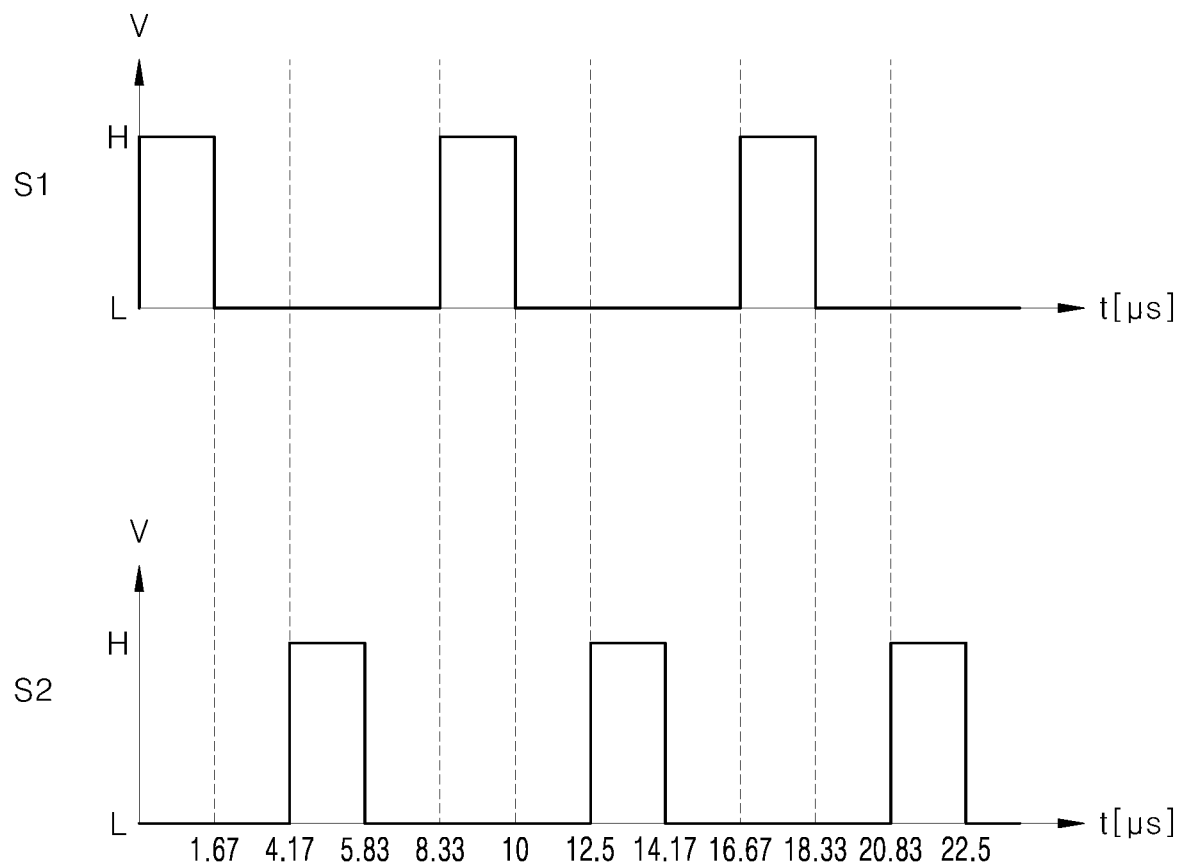
FIG. 4 is a graph of switching signals supplied to an inverter circuit through a driving circuit at time point t1 on the graph of FIG. 3.

FIG. 4 shows one example of the switching signal S1, S2 supplied to each of the switching elements SW1, SW2 included in the inverter circuit 120 at time point t1. FIG. 4 is a graph of switching signals supplied to an inverter circuit through a driving circuit at time point t1 on the graph of FIG. 3. FIG. 4 shows a switching signal S1, S2 having the first reference duty ratio of 20% and the first reference frequency of 120 kHz.

In this case, the first switching element SW1 and the second switching element SW2 may complementarily operate. That is, the first switching signal S1 and the second switching signal S2 have a high value H at different time points.

The first switching signal S1 has a high value H from 0 μs to 1.67 μs in a first period between 0 μs and 8.33 μs, and has a low value L in the remaining period. The second switching signal S2 has a high value H from 4.17 μs to 5.83 μs in the first period between 0 μs and 8.33 μs, and has a low value L in the remaining period. In the next period, the same pattern may be repeated.

Referring back to FIG. 3, as the controller 150 controls the driving circuit to supply the switching signal S1, S2 having the first reference duty ratio and the first reference frequency to each of the switching elements SW1, SW2 included in the interface circuit 120, the resonance current value IR increases slowly. Thus, the driving noise which is generated when the controller 150 initiates the operation of detecting a container may be minimized.

The controller 150 increases the duty ratio of the switching signal S1, S2 to the second reference duty ratio after the controller 150 initiates the operation of detecting a container by supplying the switching signal S1, S2 as in FIG. 4 at time point t1 through the driving circuit 130.

The second reference duty ratio may be set to a maximum value (e.g., 50%) of duty ratios that can be possessed by the switching signals S1, S2 supplied to the switching elements SW1, SW2. The second reference duty ratio is higher than the first reference duty ratio. The maximum value of the duty ratio is the largest value among duty ratios of the switching signal that can be set, and is a value that can be set differently according to an embodiment.

Since the duty ratio of the switching signal S1, S2 increases from the first reference duty ratio to the second reference duty ratio as described, switching loss, caused by the switching of the switching element SW1, SW2 at the first reference duty ratio, may be minimized.

Figure 5:
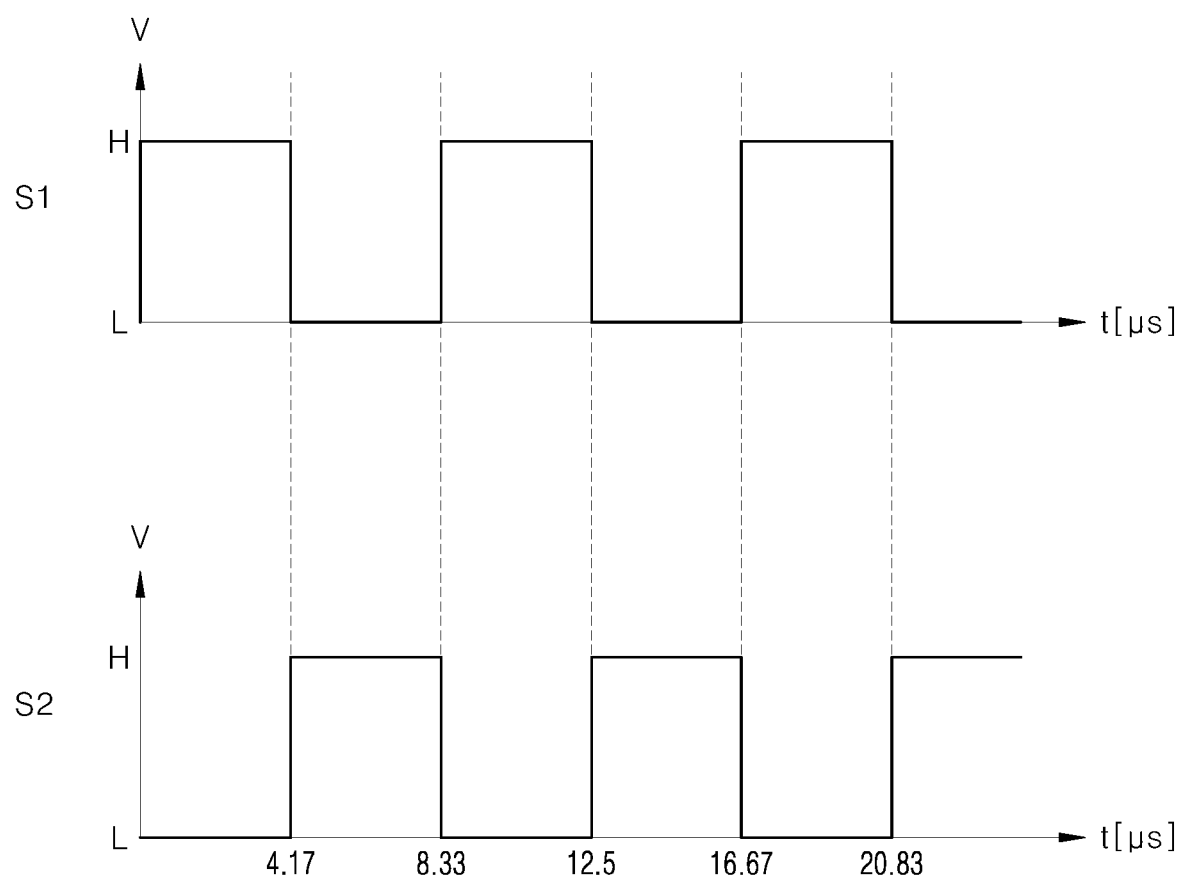
FIG. 5 is a graph of switching signals supplied to an inverter circuit through a driving circuit at time point t2 on the graph of FIG. 3.

In this case, the controller 150 may increase the duty ratio of the switching signal S1, S2 to the second reference duty ratio at time point t2. That is, after a predetermined time has lapsed from time point t1, i.e., at time point t2 after time point t1, the controller 150 may increase the duty ratio of the switching signal S1, S2 to the second reference duty ratio. Here, the duty ratio of the switching signal may be instantly switched from the first reference duty ratio to the second reference duty ratio. Alternatively, the controller 150 may start to increase the duty ratio of the switching signal S1, S2 from the first reference duty ratio to the second reference duty ratio during a period from time point t1 until time point t2. Here, the duty ratio of the switching signal may be gradually increased. FIG. 5 shows one example of the switching signal S1, S2 supplied to each of the switching elements SW1, SW2 included in the inverter circuit 120 through the driving circuit 130 at time point t2.

FIG. 5 is a graph of switching signals supplied to an inverter circuit through a driving circuit at time point t2 on the graph of FIG. 3. FIG. 5 shows a switching signal S1, S2 having the second reference duty ratio of 50% and the first reference frequency of 120 kHz.

In this case, the first switching element SW1 and the second switching element SW2 may complementarily operate. That is, the first switching signal S1 and the second switching signal S2 have a high value H at different time points.

The first switching signal S1 has a high value H from 0 μs to 4.17 μs in the first period between 0 μs and 8.33 μs, and has a low value L in the remaining period. The second switching signal S2 has a high value H from 4.17 μs to 8.33 μs in the first period between 0 μs and 8.33 μs, and has a low value L in the remaining period. In the next period, the same pattern may be repeated.

Referring back to FIG. 3, the controller 150 adjusts the switching signal S1, S2 such that the waveform of the switching signal S1, S2 change from the waveform shown in FIG. 4 to the waveform shown in FIG. 5 from time point t1 to time point t2, thereby reducing switching loss that may be generated due to the long-time switching of the switching element SW1, SW2 at the first reference duty ratio. Additionally, since the switching signal S1, S2 having the first reference duty ratio is supplied at time point t1 and the switching signal S1, S2 is supplied up to time point t2 while the duty ratio of the switching signal S1, S2 increases to the second reference duty ratio, the resonance current value IR increases slowly. Thus, the driving noise that is generated when the controller 150 initiates the operation of detecting a container may be minimized.

The controller 150 allows the driving circuit 130 to supply the switching signal S1, S2 equally for predetermined reference time after increasing the duty ratio of the switching signal S1, S2 to the second reference duty ratio. That is, from time point t2 to time point t3 on the graph, the switching signal S1, S2 does not change. Since the controller 150 maintains the switching signal S1, S2 equally from time point t2 to time point t3, the frequency of the switching signal S1, S2 may be stabilized.

The controller 150 decreases the frequency of the switching signal S1, S2 to a second predetermined reference frequency after maintaining the switching signal S1, S2 equally for the reference time.

The second reference frequency may be set to a lower frequency (e.g., 60 kHz) than the first reference frequency. The second reference frequency is lower than the first reference frequency.

Since the frequency of the switching signal S1, S2 decreases from the first reference frequency to the second reference frequency, the driving noise, which is generated because energy is not sufficiently delivered when a low efficient container such as an anti-ferromagnetic container is detected at a high frequency such as the first reference frequency, may be minimized.

The controller 150 may supply the switching signal S1, S2 as in FIG. 5 through the driving circuit 130 until time point t3, and decrease the frequency of the switching signal S1, S2 at time point t4 such that the frequency of the switching signal S1, S2 becomes the second reference frequency at time point t4. That is, at a time point t4 after time point t3, the controller 150 may decrease the frequency of the switching signal S1, S2 to the second reference frequency. Here, the frequency of the switching signal may be instantly switched from the first reference frequency to the second reference frequency. Alternatively, the controller 150 may start to decrease the frequency of the switching signal S1, S2 from the first reference frequency to the second reference frequency during a period from the time point t3 until time point t4. Here, the v of the switching signal may be gradually decreased.

Figure 6:
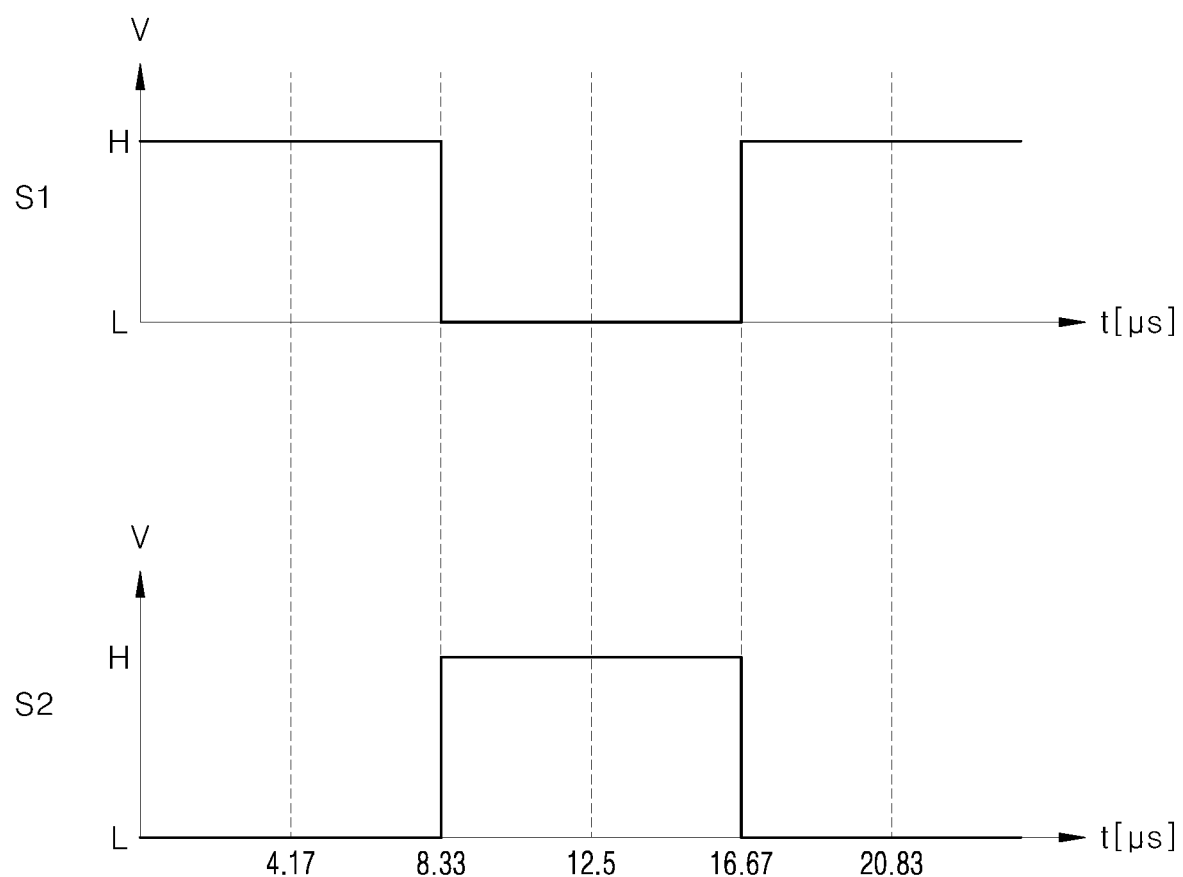
FIG. 6 is a graph of switching signals supplied to an inverter circuit through a driving circuit at time point t4 on the graph of FIG. 3.

FIG. 6 is a graph of switching signals supplied to an inverter circuit through a driving circuit at time point t4 on the graph of FIG. 3. FIG. 6 shows a switching signal S1, S2 having the second reference duty ratio of 50% and the second reference frequency of 60 kHz.

In this case, the first switching element SW1 and the second switching element SW2 may complementarily operate. That is, the first switching signal S1 and the second switching signal S2 have a high value H at different time points.

The first switching signal S1 has a high value H from 0 μs to 8.33 μs in a first period between 0 μs and 16.67 μs, and has a low value L in the remaining period. The second switching signal S2 has a high value H from 8.33 μs to 16.67 μs in the first period between 0 μs and 16.67 μs, and has a low value L in the remaining period. In the next period, the same pattern may be repeated.

Referring back to FIG. 3, the controller 150 adjusts the switching signal S1, S2 such that the waveform of the switching signal S1, S2 change from the waveform shown in FIG. 5 to the waveform shown in FIG. 6 from time point t3 to time point t4, thereby minimizing the driving noise that is generated when the operation of detecting a container is performed after the operation of the switching element SW1, SW2 at the first reference frequency.

The controller 150 decreases the frequency of the switching signal S1, S2 to the second reference frequency, stops the supply of the switching signal S1, S2 through the driving circuit 130, and then the operation of detecting a container is finished. That is, the controller 150 controls the switching signals S1, S2 such that all the switching signals S1, S2 have a low value L.

In this case, the controller 150 may end the operation of detecting a container when the supplied voltage value becomes 0 V. Since the controller 150 finishes the operation of detecting a container when the supplied voltage value Vin is 0 V, the driving noise that may be generated when the operation of detecting a container starts may be minimized.

At time point t4 on the graph of FIG. 4, the supplied voltage value Vin becomes 0 V. Accordingly, the operation of detecting a container is finished at time point t4.

As the controller 150 controls the switching signals S1, S2 such that all the switching signals S1, S2 have a low value L to end (or finish) the operation of detecting a container, the working coil 110 resonates autonomously. Accordingly, the resonance current value IR decreases. The controller 150 may determine whether a container is in the heating zone 104, based on a resonance current value IR measured by the current sensor 140, when the working coil 110 resonates autonomously.

Referring back to FIG. 2, at the end of the operation of detecting a container, i.e. after stopping the supply of the switching signals, the controller 150 determines whether a container is in (or on) a heating zone, based on a resonance current value measured by the current sensor 140.

In this case, the controller 150 may determine that a container is in (or on) the heating zone 104 when the resonance current value is lower than the reference current value. On the contrary, the controller 150 may determine that a container is not in (or on) the heating zone 104 when the resonance current value is the reference current value or higher.

As described above, the switching signal S1, S2 having the first reference duty ratio and the first reference frequency is supplied to each of the switching elements SW1, SW2 included in the inverter circuit 120, the duty ratio of the switching signal S1, S2 increases to the second reference duty ratio, and the frequency of the switching signal S1, S2 decreases to the second reference frequency. Accordingly, the driving noise that is generated when the operation of detecting a container is performed may be minimized. Further, when the supplied voltage value is 0 V, the controller 150 determines whether a container is in a heating zone and the operation of detecting a container is finished.

Thus, the driving noise that is generated when the operation of detecting a container is performed may be minimized.

Figure 7:
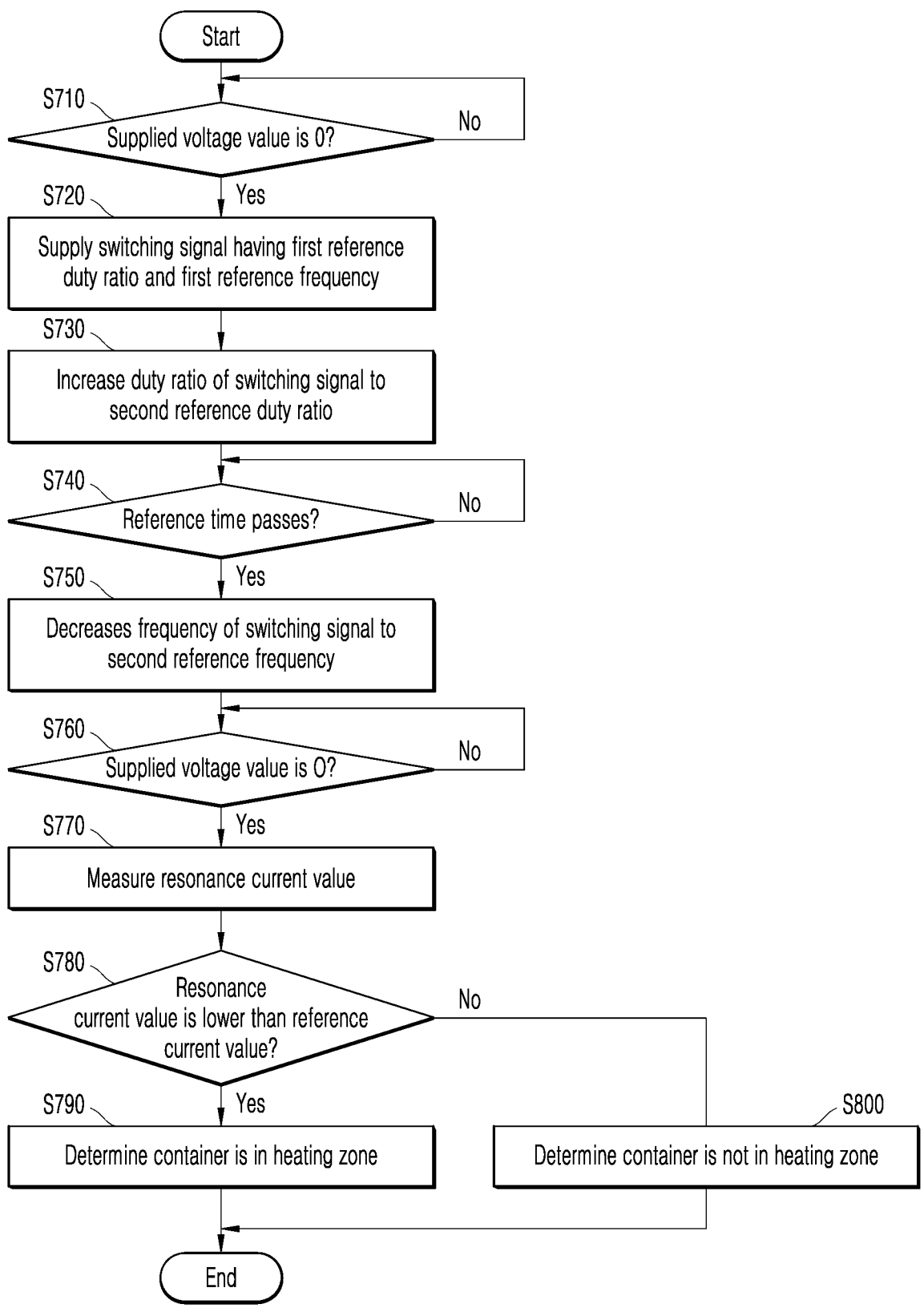
FIG. 7 is a flow chart showing a method for controlling an induction heating apparatus of one embodiment.

FIG. 7 is a flow chart showing a method for controlling an induction heating apparatus of one embodiment. The controller 150 determines whether a supplied voltage value is 0 V (S710). When the supplied voltage value is not 0 V, the controller 150 stands by until the supplied voltage value becomes 0 V.

When the supplied voltage value is 0 V, the controller 150 initiates the operation of detecting a container. As the operation of detecting a container starts, the controller 150 supplies a switching signal S1, S2 having the first reference duty ratio and the first reference frequency (S720).

Then the controller 150 increases the duty ratio of the switching signal S1, S2 from the first reference duty ratio to the second reference duty ratio (S730). The duty ratio may be gradually increased, e.g., during a predetermined first reference time.

Then the controller 150 determines whether a predetermined second reference time passes (S740). If the second reference time does not pass, the controller 150 stands by until the reference time passes. That is, the switching signal S1, S2 having the second reference duty ratio and the first reference frequency is supplied until the second reference time has lapsed.

After the second reference time has lapsed, the controller decreases the frequency of the switching signal S1, S2 from the first reference frequency to the second reference frequency (S750). The frequency may be gradually decreased, e.g., during a predetermined third reference time.

Then, the controller 150 determines again whether the supplied voltage value is 0 V (S760). When the supplied voltage value is not 0 V, the controller 150 stands by until the supplied voltage value becomes 0 V. That is, the switching signal S1, S2 having the second reference duty ratio and the second reference frequency is supplied until the supplied voltage value becomes 0 V.

When the supplied voltage value is 0 V, the controller 150 ends the operation of detecting a container. As the operation of detecting a container is finished, the controller 150 measures a resonance current value, e.g., through the current sensor 140 (S770).

Then when the resonance current value is less than the reference current value, the controller 150 determines a container is in (or on) the heating zone 104 (S790). When the resonance current value is the reference current value or higher, the controller 150 determines a container is not in (or on) the heating zone 104 (S800).

With the induction heating apparatus 100 and the method for controlling the same according to the present disclosure, the switching signal S1, S2 having the first reference duty ratio and the first reference frequency is supplied to each of the switching elements SW1, SW2 included in the inverter circuit 120, the duty ratio of the switching signal S1, S2 increases to the second reference duty ratio, and the frequency of the switching signal S1, S2 decreases to the second reference frequency, thereby making it possible to minimizing the driving noise that is generated when the operation of detecting a container is performed. Additionally, when the resonance current value is 0 V, the operation of detecting a container starts and is finished, thereby making it possible to minimize the driving noise that is generated when the operation of detecting a container is performed. As a result, noise may not be generated while the induction heating apparatus 100 is used, causing no inconvenience to the user, and user satisfaction may improve.

The embodiments are described above with reference to a number of illustrative embodiments thereof. However, embodiments are not limited to the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

One objective of the present disclosure is to provide an induction heating apparatus and a method for controlling the same that helps to minimize the driving noise that is generated when an operation of detecting a container is performed.

According to the present disclosure, a controller of an induction heating apparatus sets and adjusts a duty ratio and a frequency of a switching signal to perform an operation of detecting a container.

Based on the above feature, the driving noise that is generated when the operation of detecting a container is performed may be minimized.

An induction heating apparatus of one embodiment includes a working coil that is disposed in a position corresponding to a heating zone, an inverter circuit that includes a plurality of switching elements and supplies current to the working coil, a driving circuit that supplies a switching signal to each of the switching elements included in the inverter circuit, a current sensor that measures a resonance current value, magnitude of resonance current flowing in the working coil, and a controller that supplies a control signal for adjusting a duty ratio and a frequency of the switching signal to the driving circuit, to drive the working coil, where the controller sets and adjusts the duty ratio and the frequency of the switching signal to perform an operation of detecting a container, and based on a resonance current value measured by the current sensor, determines whether a container is in the heating zone after the operation of detecting a container is finished.

In one embodiment, the controller of the induction heating apparatus supplies a switching signal having a first predetermined reference duty ratio and a first predetermined reference frequency to each of the switching elements included in the inverter circuit through the driving circuit, to initiate the operation of detecting a container, and the controller increases the duty ratio of the switching signal to a second predetermined reference duty ratio and decreases the frequency of the switching signal to a second predetermined reference frequency, to perform the operation of detecting a container.

In one embodiment, the induction heating apparatus further includes a voltage sensor that measures a supplied voltage value, a voltage value supplied to the inverter circuit, and the controller of the induction heating apparatus starts the operation of detecting a container when the supplied voltage value is 0.

In one embodiment, the controller of the induction heating apparatus increases the duty ratio of the switching signal to the second predetermined reference duty ratio, and then decreases the frequency of the switching signal to the second predetermined reference frequency after predetermined time passes.

In one embodiment, the controller of the induction heating apparatus is finished the operation of detecting a container when the supplied voltage value becomes 0 V.

In one embodiment, the controller of the induction heating apparatus determines a container is in the heating zone when the resonance current value is lower than a predetermined reference current value, and determines a container is not in the heating zone when the resonance current value is the reference current value or higher.

In another embodiment, a method for controlling an induction heating apparatus, including a working coil that is disposed in a position corresponding to a heating zone, an inverter circuit that includes a plurality of switching elements and supplies current to the working coil, a driving circuit that supplies a switching signal to each of the switching elements included in the inverter circuit, a current sensor that measures a resonance current value, magnitude of resonance current flowing in the working coil, and a controller that supplies a control signal for adjusting a duty ratio and a frequency of the switching signal to the driving circuit, to drive the working coil, includes setting and adjusting a duty ratio and a frequency of the switching signal to perform the operation of detecting a container by the controller, measuring a resonance current value by the current sensor after the operation of detecting a container is finished, and determining whether a container is in the heating zone by the controller based on the resonance current value.

In another embodiment, setting and adjusting a duty ratio and a frequency of the switching signal to perform an operation of detecting a container by the controller in the method includes supplying a switching signal having a first predetermined reference duty ratio and a first predetermined reference frequency to each of the switching elements included in the inverter circuit through the driving circuit, to initiate the operation of detecting a container by the controller; and increasing the duty ratio of the switching signal to a second predetermined reference duty ratio and decreasing the frequency of the switching signal to a second predetermined reference frequency, to perform the operation of detecting a container by the controller.

In another embodiment, the induction heating apparatus further includes a voltage sensor that measures a supplied voltage value, a voltage value supplied to the inverter circuit, and the method further includes the operation of detecting a container starts by the controller when the supplied voltage value is 0.

In another embodiment, increasing the duty ratio of the switching signal to a second predetermined reference duty ratio and decreasing the frequency of the switching signal to a second predetermined reference frequency to perform the operation of detecting a container in the method includes increasing the duty ratio of the switching signal to the second predetermined reference duty ratio, and then decreasing the frequency of the switching signal to the second predetermined reference frequency after predetermined time passes.

In another embodiment, the method further includes ending the operation of detecting a container by the controller when the supplied voltage value becomes 0 V.

In another embodiment, determining whether a container is in the heating zone by the controller based on the resonance current value in the method includes determining a container is in the heating zone when the resonance current value is lower than a predetermined reference current value, and determining a container is not in the heating zone when the resonance current value is the reference current value or higher.

In an induction heating apparatus and a method for controlling the same according to the present disclosure, a switching signal having a first reference duty ratio and a first reference frequency is supplied to each of the switching elements included in an inverter circuit, the duty ratio of the switching signal increases to a second reference duty ratio, and the frequency of the switching signal decreases to a second reference frequency, thereby making it possible to minimizing the driving noise that is generated when an operation of detecting a container is performed. As a result, noise may not be generated while the induction heating apparatus is used, causing no inconvenience to a user, and user satisfaction may improve.

According to one aspect, an induction heating apparatus includes a working coil that is disposed in a position corresponding to a heating zone, an inverter circuit that includes a plurality of switching elements and supplies current to the working coil, a driving circuit that supplies a switching signal to each of the switching elements included in the inverter circuit, a current sensor that measures a resonance current value, magnitude of resonance current flowing in the working coil, and a controller that supplies a control signal for adjusting a duty ratio and a frequency of the switching signal to the driving circuit, to drive the working coil, where the controller sets and adjusts the duty ratio and the frequency of the switching signal to perform an operation of detecting a container, and based on a resonance current value measured by the current sensor, determines whether a container is in the heating zone after the operation of detecting a container is finished.

According to one aspect, an induction heating apparatus includes: a working coil disposed in a position corresponding to a heating zone; an inverter circuit with a plurality of switching elements for supplying current to the working coil; a driving circuit for supplying a switching signal to each of the switching elements of the inverter circuit; and a controller for adjusting a duty ratio and a frequency of the switching signal. The controller is configured to perform an operation for detecting a container on the heating zone, comprising the steps of: supplying a switching signal to each of a plurality of switching elements of an inverter circuit of the induction heating apparatus, the switching signal having a predetermined duty ratio and a predetermined frequency; adjusting the duty ratio and the frequency of the switching signal, while supplying the switching signal; measuring a resonance current value after stopping the supply of the switching signal; and determining whether a container is present in a heating zone of the induction heating apparatus based on the resonance current value.

According to a further aspect, a method for controlling an induction heating apparatus, e.g., an induction heating apparatus according to any one of the herein described embodiments, is provided. In particular, a method for controlling an induction heating apparatus, including a working coil that is disposed in a position corresponding to a heating zone, an inverter circuit that includes a plurality of switching elements and supplies current to the working coil, a driving circuit that supplies a switching signal to each of the switching elements included in the inverter circuit, a current sensor that measures a resonance current value, magnitude of resonance current flowing in the working coil, and a controller that supplies a control signal for adjusting a duty ratio and a frequency of the switching signal to the driving circuit, to drive the working coil, may be provided. A method for controlling an induction heating apparatus includes setting and adjusting a duty ratio and a frequency of the switching signal to perform the operation of detecting a container by the controller, measuring a resonance current value by the current sensor after the operation of detecting a container is finished, and determining whether a container is in the heating zone by the controller based on the resonance current value.

According to a further aspect, a method for controlling an induction heating apparatus, e.g. an induction heating apparatus according to any one of the herein described embodiments, includes: supplying a switching signal to each of a plurality of switching elements of an inverter circuit of the induction heating apparatus, the switching signal having a predetermined duty ratio and a predetermined frequency; adjusting the duty ratio and the frequency of the switching signal, while supplying the switching signal; measuring a resonance current value after stopping the supply of the switching signal; and determining whether a container is present in a heating zone of the induction heating apparatus based on the resonance current value.

The induction heating apparatus and/or the method according to any one of these aspects may include one or more of the following features:

The controller of the induction heating apparatus may be configured to supply, e.g., at a first time point, a switching signal having a first predetermined reference duty ratio and a first predetermined reference frequency to each of the switching elements included in the inverter circuit through the driving circuit, to initiate the operation of detecting a container.

The first predetermined reference duty ratio may be minimum duty ratio of the available or allowed duty ratios of the switching signal. For instance, the first predetermined reference duty ratio may be less than 50%, preferably less than 30%, in particular about 20%. The first predetermined reference frequency may be higher than 100 kHz, in particular about 120 kHz. The switching signals supplied to different switching elements may all have the first predetermined reference duty ratio and the first predetermined reference frequency, but may have a high value at different time points. That is, a switching signal for a second switching element may have a high value (on-value or duty value) after a switching signal for a first switching element has returned from the high value to the low value (off-value).

The controller may be configured to, e.g., at a second time point, increase the duty ratio of the switching signal to a second predetermined reference duty ratio and/or to decrease the frequency of the switching signal to a second predetermined reference frequency, to perform the operation of detecting a container.

The second predetermined reference duty ratio may be larger than the first predetermined reference duty ratio. The second predetermined reference duty ratio may be set to a maximum of the available or allowed duty ratios of the switching signal. In particular, the second predetermined reference duty ratio may be about 50%. The switching signals supplied to different switching elements may all have the second predetermined reference duty ratio and the first predetermined reference frequency, but may have a high value at different time points.

At a second time point after a first time point, at which the operation of detecting a container is initiated and/or at which the switching signal having the first predetermined reference duty ratio and the first predetermined reference frequency is supplied, the controller may be configured to control the driving circuit to supply the switching signal having the second reference duty ratio and the first predetermined reference frequency. Here, the duty ratio of the switching signal may be instantly switched from the first reference duty ratio to the second reference duty ratio at the second time point. Alternatively, the controller may be configured to increase the duty ratio of the switching signal from the first reference duty ratio to the second reference duty ratio during a predetermined period, e.g., starting at or after the first time point, at which the operation of detecting a container is initiated. Here, the duty ratio of the switching signal may be gradually increased.

The induction heating apparatus may further include a voltage sensor configured to measure a supplied voltage value e.g., a voltage value supplied to the inverter circuit, e.g., from an external power supply. The controller of the induction heating apparatus may be configured to start the operation of detecting a container when the supplied voltage value is 0. That is, at the first time point when it is detected that the value of the supplied voltage, e.g., supplied from an external power supply, is 0, the controller may be configured to control the driving circuit to supply the switching signal having the first predetermined reference duty ratio and the first predetermined reference frequency to the switching elements of the inverter circuit to initiate the operation of detecting a container.

The switching signal having the second predetermined reference duty ratio and the first predetermined reference frequency may be supplied for a predetermined time period, e.g., from the second time point until a third time point, to stabilize the frequency of the switching signal.

At a fourth time point after the third time point, the controller may be configured to decrease the frequency of the switching signal to a second predetermined reference frequency.

At a fourth time point after the third time point, the controller may be configured to control the driving circuit to supply the switching signal having the second reference duty ratio and the second predetermined reference frequency. Here, the frequency of the switching signal may be instantly switched from the first reference frequency to the second reference frequency at the fourth time point. Alternatively, the controller may be configured to decrease the frequency of the switching signal from the first reference frequency to the second reference frequency during a predetermined time period, e.g., starting at or after the third time point until the fourth time point. Here, the frequency of the switching signal may be gradually decreased. The switching signals supplied to different switching elements may all have the second predetermined reference duty ratio and the second predetermined reference frequency, but may have a high value at different time points. The second predetermined reference frequency may be lower than the first predetermined reference frequency, e.g., the second predetermined reference frequency may be lower than 80 kHz, in particular about 60 kHz.

The controller of the induction heating apparatus may be configured to increase the duty ratio of the switching signal (s) to the second predetermined reference duty ratio, and to then, i.e., thereafter, decrease the frequency of the switching signal to the second predetermined reference frequency after predetermined time passes. The controller of the induction heating apparatus may be configured to finish the operation of detecting a container when the supplied voltage value becomes 0 V. That is, the controller is configured to stop the driving circuit to supply the switching signals.

The controller of the induction heating apparatus may be configured to determine that a container is in the heating zone when the resonance current value is lower than a predetermined reference current value, and/or to determine that a container is not in the heating zone when the resonance current value is the reference current value or higher.

The step of setting and adjusting a duty ratio and a frequency of the switching signal to perform an operation of detecting a container by the controller in the method may include supplying a switching signal having a first predetermined reference duty ratio and a first predetermined reference frequency to each of the switching elements included in the inverter circuit through the driving circuit, to initiate the operation of detecting a container by the controller; and increasing the duty ratio of the switching signal to a second predetermined reference duty ratio and decreasing the frequency of the switching signal to a second predetermined reference frequency, to perform the operation of detecting a container by the controller.

The induction heating apparatus may further include a voltage sensor configured to measure a supplied voltage value and/or a voltage value supplied to the inverter circuit. The method may further include starting the operation of detecting a container starts by the controller when the supplied voltage value is 0. The step of increasing the duty ratio of the switching signal to a second predetermined reference duty ratio and decreasing the frequency of the switching signal to a second predetermined reference frequency to perform the operation of detecting a container in the method may include increasing the duty ratio of the switching signal to the second predetermined reference duty ratio, and then decreasing the frequency of the switching signal to the second predetermined reference frequency after predetermined time passes.

The method may further include ending the operation of detecting a container by the controller when the supplied voltage value becomes 0 V.

The step of determining whether a container is in the heating zone by the controller based on the resonance current value in the method may include determining a container is in the heating zone when the resonance current value is lower than a predetermined reference current value, and determining a container is not in the heating zone when the resonance current value is the reference current value or higher.

At a first time point, the switching signal may be supplied to each of the switching elements having a first predetermined reference duty ratio and a first predetermined reference frequency. After the first time point, the duty ratio of the switching signal may be increased from the first predetermined reference duty ratio to a second predetermined reference duty ratio. The duty ratio of the switching signal may be gradually increased from the first predetermined reference duty ratio to the second predetermined reference duty ratio during a first predetermined reference time period.

After the switching signal has been supplied with the second predetermined reference duty ratio and the first predetermined reference frequency, e.g. for a second predetermined reference time period, the frequency of the switching signal may be decreased from the first predetermined reference frequency to a second predetermined reference frequency. The frequency of the switching signal may be gradually decreased from the first predetermined reference frequency to the second predetermined reference frequency, e.g., during a third predetermined reference time period. The second predetermined reference time period may be after the first predetermined reference time period. Preferably, the second predetermined reference time period starts when the first predetermined reference time period ends. The third predetermined reference time period may be after the second predetermined reference time period. Preferably, the third predetermined reference time period starts when the second predetermined reference time period ends. The supplying of the switching signal may be started and/or ended, when a value of voltage supplied to the inverter circuit, e.g., from an external power supply, is 0. The value of voltage supplied to the inverter circuit may be detected by a voltage detector of the induction heating apparatus. The resonance current value may be measured by a current sensor of the induction heating apparatus. It may be determined that a container is present in the heating zone, when the measured resonance current value is lower than a predetermined reference current value; and/or it may be determined that no container is present in the heating zone, when the measured resonance current value is equal to or higher than the predetermined reference current value.

In an induction heating apparatus and a method for controlling the same according to an embodiment the present disclosure, a switching signal having a first reference duty ratio and a first reference frequency is supplied to each of the switching elements included in an inverter circuit, the duty ratio of the switching signal increases to a second reference duty ratio, and the frequency of the switching signal decreases to a second reference frequency, thereby making it possible to minimizing the driving noise that is generated when an operation of detecting a container is performed. As a result, noise may not be generated while the induction heating apparatus is used, causing no inconvenience to a user, and user satisfaction may improve.

The induction heating apparatus and the method for controlling the same according to the present disclosure may reduce the possibility that a user thinks that the induction heating apparatus works improperly due to driving noise.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An induction heating apparatus, comprising:
   a working coil disposed to correspond to a heating zone;
   an inverter circuit that includes a plurality of switching elements, and is configured to supply current to the working coil;
   a driving circuit configured to supply a switching signal to each of the switching elements;
   a current sensor configured to determine a resonance current value, and a magnitude of resonance current flowing in the working coil; and
   a controller configured to provide a control signal to the driving circuit, the control signal to adjust a duty ratio and a frequency of the switching signals,
   wherein the controller is configured to:
      set and adjust the duty ratio and the frequency of the switching signals to perform an operation of detecting a container, and
      determine whether the container is on the heating zone after finishing the operation of detecting the container, based on the resonance current value determined by the current sensor,
wherein the controller is configured to:
control the driving circuit to provide a switching signal having a first predetermined reference duty ratio and a first predetermined reference frequency to each of the switching elements, so as to initiate the operation of detecting the container, and
control the driving circuit to increase the duty ratio of the switching signal to a second predetermined reference duty ratio and to decrease the frequency of the switching signal to a second predetermined reference frequency so as to perform the operation of detecting the container.

2. The induction heating apparatus of claim 1, comprising a voltage sensor configured to determine a supplied voltage value, which is a voltage value to be provided to the inverter circuit,
wherein the controller is configured to initiate the operation of detecting the container when the supplied voltage value is determined to be 0 V.

3. The induction heating apparatus of claim 1, wherein the controller is configured to increase the duty ratio of the switching signal to the second predetermined reference duty ratio, and then to decrease the frequency of the switching signal to the second predetermined reference frequency after a predetermined time passes from the increase of the duty ratio of the switching signal to the second predetermined reference duty ratio.

4. The induction heating apparatus of claim 1, comprising a voltage sensor configured to determine a supplied voltage value, and magnitude of voltage supplied to the inverter circuit,
wherein the controller is configured to finish the operation of detecting the container when the supplied voltage value is determined to become 0 V.

5. The induction heating apparatus of claim 1, wherein
the controller is configured to determine that the container is on the heating zone when the determined resonance current value is less than a predetermined reference current value, and
the controller is configured to determine that the container is not on the heating zone when the determined resonance current value is equal to or greater than the reference current value.

6. A method for controlling an induction heating apparatus that includes a working coil disposed to correspond to a heating zone, an inverter circuit that includes a plurality of switching elements, and is configured to supply current to the working coil, a driving circuit configured to provide a switching signal to each of the switching elements, a current sensor configured to determine a resonance current value, and a magnitude of resonance current flowing in the working coil, and a controller configured to provide a control signal for adjusting a duty ratio and a frequency of the switching signal to the driving circuit, comprising:
setting and adjusting, by the controller, a duty ratio and a frequency of the switching signal to perform an operation of detecting a container;
determining, by the current sensor, a resonance current value after finishing the operation of detecting the container; and
determining, by the controller, whether the container is on the heating zone based on the determined resonance current value,
wherein the setting and the adjusting of the duty ratio and the frequency of the switching signal comprises:
providing, by the driving circuit, a switching signal having a first predetermined reference duty ratio and a first predetermined reference frequency to each of the switching elements, so as to initiate the operation of detecting the container; and
increasing the duty ratio of the switching signal to a second predetermined reference duty ratio and decreasing the frequency of the switching signal to a second predetermined reference frequency, so as to perform the operation of detecting the container.

7. The method of claim 6, wherein
the induction heating apparatus includes a voltage sensor configured to determine a supplied voltage value, which is a voltage value to be provided to the inverter circuit, and
the method comprises initiating the operation of detecting the container by the controller when the supplied voltage value is determined to be 0 V.

8. The method of claim 6, wherein increasing the duty ratio of the switching signal to the second predetermined reference duty ratio and decreasing the frequency of the switching signal to the second predetermined reference frequency, comprises increasing the duty ratio of the switching signal to the second predetermined reference duty ratio, and then decreasing the frequency of the switching signal to the second predetermined reference frequency after a predetermined time passes from the increase of the duty ratio of the switching signal to the second predetermined reference duty ratio.

9. The method of claim 6, wherein
the induction heating apparatus includes a voltage sensor configured to determine a supplied voltage value, which is a voltage value to be provided to the inverter circuit, and
the method comprises finishing the operation of detecting the container by the controller when the supplied voltage value is determined to become 0 V.

10. The method of claim 6, wherein the determining whether the container is on the heating zone based on the resonance current value comprises:
determining that the container is on the heating zone when the determined resonance current value is less than a predetermined reference current value; and
determining that the container is not on the heating zone when the determined resonance current value is equal to or greater than the reference current value.

11. An induction heating apparatus, comprising:
a working coil;
an inverter circuit that includes a plurality of switching elements, and is configured to supply current to the working coil;
a driving circuit configured to supply switching signals to the switching elements;
a current sensor configured to determine a resonance current value with respect to the working coil; and
a controller configured to control the switching signals output from the driving circuit to the switching elements,
wherein the controller is configured to:
perform an operation of detecting a container based on duty ratio and frequency of the switching signals, and
determine whether the container is on the heating zone after finishing the operation of detecting the container, based on the resonance current value determined by the current sensor, and
wherein the controller is configured to:

control the driving circuit to provide a switching signal having a first predetermined reference duty ratio and a first predetermined reference frequency to each of the switching elements, so as to initiate the operation of detecting the container, and control the driving circuit to increase the duty ratio of the switching signal to a second predetermined reference duty ratio and to decrease the frequency of the switching signal to a second predetermined reference frequency, so as to perform the operation of detecting the container.

12. The induction heating apparatus of claim 11, comprising a voltage sensor configured to determine a supplied voltage value, which is a voltage value to be provided to the inverter circuit, wherein the controller is configured to initiate the operation of detecting the container when the supplied voltage value is determined to be 0 V.

13. The induction heating apparatus of claim 11, wherein the controller is configured to increase the duty ratio of the switching signal to the second predetermined reference duty ratio, and then to decrease the frequency of the switching signal to the second predetermined reference frequency after a predetermined time passes from the increase of the duty ratio of the switching signal to the second predetermined reference duty ratio.

14. The induction heating apparatus of claim 11, comprising a voltage sensor configured to determine a supplied voltage value, and magnitude of voltage supplied to the inverter circuit, wherein the controller is configured to finish the operation of detecting the container when the supplied voltage value is determined to become 0 V.

15. The induction heating apparatus of claim 11, wherein the controller is configured to determine that the container is on the heating zone when the determined resonance current value is less than a predetermined reference current value.

16. The induction heating apparatus of claim 11, wherein the controller is configured to determine that all the container is not on the heating zone when the determined resonance current value is equal to or greater than the reference current value.

17. The induction heating apparatus of claim 11, comprising a case for supporting the working coil, and an upper plate configured to support the container, wherein the heating zone corresponds to an area on the upper plate which is vertically aligned with the working coil.

* * * * *